United States Patent
Bielski et al.

(10) Patent No.: US 9,906,624 B2
(45) Date of Patent: Feb. 27, 2018

(54) METHOD FOR THROTTLING MULTIPLE CLIENT APPLICATIONS SENDING DATA TO A SERVER APPLICATION

(71) Applicant: INTERNATIONAL BUSINESS MACHINES CORPORATION, Armonk, NY (US)

(72) Inventors: Stanley M. Bielski, Pittsburgh, PA (US); Valeria Brusilovsky, Pittsburgh, PA (US); Scott A. Lindner, Pittsburgh, PA (US); Christopher R. Palmer, Pittsburgh, PA (US); Gregory J. Seaman, Philadelphia, PA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 301 days.

(21) Appl. No.: 14/067,513

(22) Filed: Oct. 30, 2013

(65) Prior Publication Data

US 2015/0120808 A1   Apr. 30, 2015

(51) Int. Cl.
*G06F 15/16* (2006.01)
*H04L 29/08* (2006.01)

(52) U.S. Cl.
CPC .................................. *H04L 67/325* (2013.01)

(58) Field of Classification Search
CPC   H04L 29/08072; H04L 29/06; H04L 29/0809
USPC ....................................................... 709/203
See application file for complete search history.

(56) References Cited

U.S. PATENT DOCUMENTS

| | | | |
|---|---|---|---|
| 5,522,077 A | | 5/1996 | Cuthbert et al. |
| 6,418,474 B1 * | | 7/2002 | Morris ................... H04L 29/06 709/224 |
| 2005/0223089 A1 * | | 10/2005 | Rhodes ............... H04L 43/0876 709/223 |
| 2009/0172138 A1 | | 7/2009 | Wang et al. |
| 2010/0063998 A1 | | 3/2010 | Nakamura |

OTHER PUBLICATIONS

Jain, V. et al.; "Utilizing a Globally Unique Identifier to Monitor Connection Requests"; An IP.com Prior Art Database Technical Disclosure; http://ip.com/IPCOM/000159159D; Oct. 10, 2007.

* cited by examiner

*Primary Examiner* — Alan S Chou
(74) *Attorney, Agent, or Firm* — Patterson + Sheridan, LLP

(57) ABSTRACT

Embodiments presented herein provide a protocol for throttling requests of multiple client applications sending data to a server. When a server receives a request from a client, the server increments a counter. Based on the counter value with respect to a high-water mark value and a low-water mark value, the server may enter a throttling period, upon which the server sends acknowledgments that include a throttle identifier to requesting clients. When a client receives an acknowledgment with a throttle identifier, the client waits for a delay period before sending a subsequent request. The server continues to send acknowledgments with a throttle identifier while in the throttling period. The client increases the delay period each time it receives an acknowledgment with the same throttle identifier as the previous one.

20 Claims, 7 Drawing Sheets

METHOD FOR THROTTLING MULTIPLE CLIENT APPLICATIONS SENDING DATA TO A SERVER APPLICATION

BACKGROUND

Technical Field

Embodiments presently disclosed herein relate to methods used to improve quality of service in a client-server network. More specifically, embodiments provide a protocol to coordinate throttling across multiple clients sending information to a server.

Description of the Related Art

In client-server architectures, tasks or workloads are partitioned between servers and clients. Server applications provide a function or service to client systems that initiate requests for such services over a computer network. Server applications and client applications exchange messages in a request-response messaging pattern. That is, the client application sends a request, and the server application returns a response, typically including an acknowledgment. To communicate, server and client applications use a communications protocol that establishes a common set of rules so that both the client and server know what to expect.

Generally, a distributed system with multiple front-end client systems may send data for multiple back-end server systems to process. For example, client applications in a social media service may send messages posted on social media servers (e.g., services that allow users to chat with other users, post status updates, or post brief text messages and metadata) from different sources in large groups for server applications to process for data mining purposes. In response, the server applications may store the messages in an inverted index, allowing for full-text searching. A client application sends units of work (e.g., in this case, social media data) to a server for the server to process. After the server application receives the request, the server application sends an acknowledgment to the client application.

However, it is possible for client applications to overwhelm servers with more requests than the server application can handle. As a result, server system resources (e.g., CPU, I/O, memory) become exhausted, weakening the overall system performance. To address this issue, a communication protocol may throttle requests using different approaches. One approach is for client applications to detect when the system performance of a server is experiencing sub-optimal performance and, in response, throttle the sending rate. However, this approach does not ensure fair quality of service across all client systems. For example, one client application may continue sending requests at a normal rate while another client application continues throttling its own requests. Another approach is for the server to detect when the request rate across all clients exceeds a given threshold. When the requests exceed the threshold, the server prevents clients from sending requests until the server frees some resources. However, this approach requires the server to expend resources to receive and understand a request even while the server is currently throttling. Therefore, it is still possible for clients to overwhelm the server with requests.

SUMMARY

Embodiments presently disclosed herein provide a method for managing a rate of receiving data packages by a server. The method generally includes receiving, from a first one of a plurality of clients, a data package to be processed by the server. In response to determining that a total number of pending data packages waiting to be processed by the server exceeds a first threshold, a throttling session is initiated on the server. The clients delay sending additional data packages to the server during the throttling session. The method also generally includes sending an acknowledgment of the received data package to the client.

Another embodiment of the invention includes a computer program product, the computer program product comprising a computer usable medium having computer usable program code providing an operation for managing a rate of receiving data packages by a server. The code, when executed on a processor, may generally be configured to receive, from a first one of a plurality of clients, a data package to be processed by the server. In response to determining that a total number of pending data packages waiting to be processed by the server exceeds a first threshold, a throttling session is initiated on the server. The clients delay sending additional data packages to the server during the throttling session. The code may also be configured to send an acknowledgment of the received data package to the client.

Still another embodiment of the invention includes a system having a processor and a memory containing an operation for managing a rate of receiving data packages by a server. The operation may generally include receiving, from a first one of a plurality of clients, a data package to be processed by the server. In response to determining that a total number of pending data packages waiting to be processed by the server exceeds a first threshold, a throttling session is initiated on the server. The clients delay sending additional data packages to the server during the throttling session. The operation may also generally include sending an acknowledgment of the received data package to the client.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
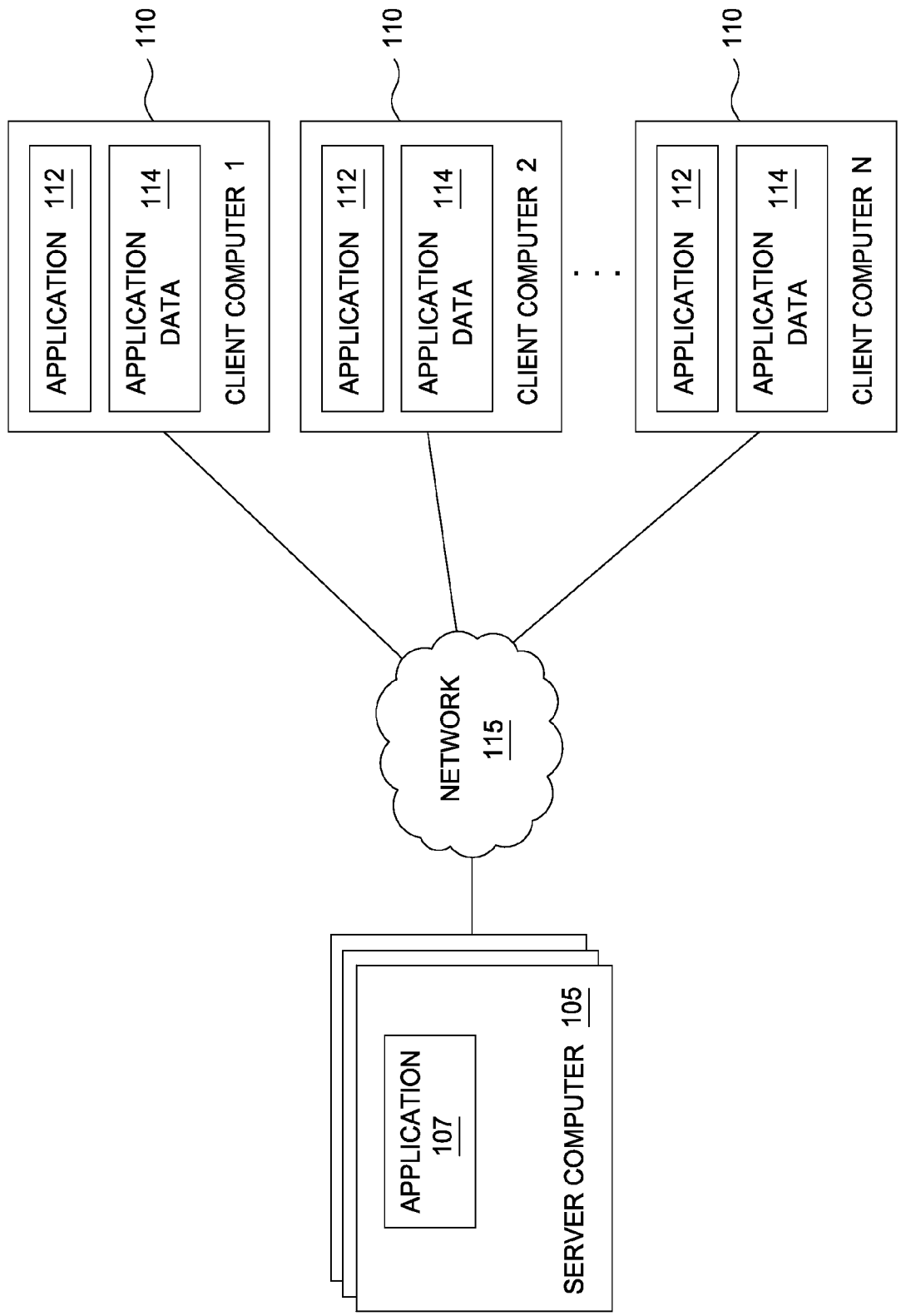
FIG. 1 illustrates an example client-server environment, according to one embodiment.

Embodiments presented herein provide techniques for throttling client application requests sent to a server application. More specifically, the techniques describe a protocol to coordinate throttling across multiple client applications based on server information without requiring client-to-client communication or coordination. In one embodiment, server maintains a counter that tracks the current amount of work currently being processed. When a client sends a request to the server, the server increments the counter. When the server completes the request, the server decrements the counter. While processing requests, the server compares the counter to a high-water mark and a low-water mark. The water marks are configurable threshold values, where the server enters a throttling session if the counter reaches the high-water mark and the server exits the throttling session if the counter falls below the low-water mark. Given the value of the counter at the time of the comparison, the server may enter a throttling session. During the throttling session, the server includes a throttle identifier in each acknowledgment sent to the client. The throttle identifier is specific to each throttling session. When a client receives the acknowledgment with the throttle identifier, the client determines a delay period for sending a further request. After waiting for the delay period, the client sends a following request. If the client receives another acknowledgment with the same throttle identifier, the client increases the delay period because a stable rate of requests has not yet been established on the server's end.

Embodiments presented herein provide a collaborative client-server protocol that ensures that the server performs work requested by the client systems without being overwhelmed by incoming requests. By causing the clients to delay requests after the number of outstanding requests reaches a certain point, the server is less likely to drop requests. Further, this approach ensures fairness across client requests without requiring client-to-client communication. As a result, clients expend fewer system resources. For example, because the clients can distinguish between different throttling periods based on a throttling identifier that is unique to a given throttling period, client systems face a lesser risk of starvation. Additionally, because clients are delaying requests during a throttling session, servers expend fewer resources on receiving and understanding additional requests.

In the following, a social media post sweeper is used as a reference example to describe a type of application where the client-server architecture may use the throttling approach described. Of course, one of skill in the art will recognize that the embodiments described herein may be applied in other contexts related to throttling client requests in the client-server architecture. For example, the embodiments may be used for other data mining applications where clients send large data for processing by a server.

FIG. 1 illustrates an example client-server environment 100, according to one embodiment. As shown, client-server environment 100 includes one or more server computers 105. A server computer 105 hosts a computing resource application 107 that provides a service accessed by multiple client computers 110 over a network 115. Application 107 collects and analyzes social media data (such as status updates, brief text messages, metadata, etc.). Specifically, client computers 110 scrape the posts (application data 114) and sends application data 114 to server computer 105. In turn, application 107 may input application data 114 into an inverted index or perform other processing related to data analytics. Server computer 105 may be a physical computing system (e.g., a system in a data center) or may be a virtual computing instance executing within a computing cloud. In general, the network 115 may be a telecommunications network and/or a wide area network (WAN). In a particular embodiment, the network 115 is the Internet.

Each client computer 110 executes an application 112 that communicates with application 107 in server computer 105. For example, application 112 may send application data 114 to server computer 105 as a request. Server computer 105 receives the request and processes the application data 114 and returns a response in the form of an acknowledgment after completing the requested work. In processing each request, server computer 105 expends resources such as CPU, memory, and I/O operations. Therefore, as the number of requests from multiple client computers 110 increases, server computer 105 may respond to requests at a lower rate.

To improve performance, embodiments presented herein describe a protocol between applications 107 and 112 that provide techniques for throttling requests by client computers 110. When server computer 105 receives a request, application 107 increments a counter that represents how many pending requests that server computer 105 is responsible for. If the counter is over a certain threshold value, then server computer 105 begins a throttling period. Application 107 adds a throttle identifier to the acknowledgment sent to client computer 110. The throttle identifier signals to client computer 110 to delay requests for a period. In one embodiment, the throttle identifier is a monotonically increasing number that is distinct to a given throttling period. Alternatively, the throttle identifier may include an initial time period for the client to delay requests. Further, as client computer 110 receives further acknowledgments from server computer 105 that include the identical throttle identifier, client computer 110 increases the delay period each time. Server computer 105 continues to include the throttle identifier to acknowledgments until the number of pending requests is at a manageable level determined by a threshold (described in further detail below).

Figure 2:
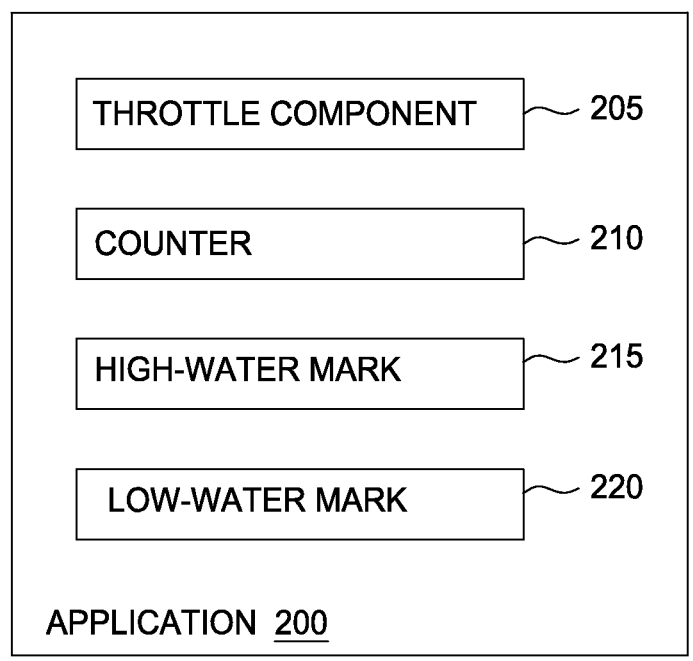
FIG. 2 illustrates a server application that throttles requests based on server information, according to one embodiment.

FIG. 2 further illustrates a server application 200 that manages the rate of requests arriving from multiple client computers, according to one embodiment. As shown, the application 200 includes a throttle component 205, a counter 210, a high-water mark 215, and a low-water mark 220. Counter 210 represents a number of outstanding requests for which the server is currently responsible. Thus, when the server receives or completes a request, the server increments or decrements the counter, respectively. Further, any time the counter value changes (i.e., whenever the server receives or completes a request), application 200 compares the counter to low-water mark 220 and high-water mark 215. High-water mark 215 and low-water mark 220 are threshold values, where low-water mark 220 represents an amount of requests that the application can normally handle, and high-water mark 215 represents an amount of requests where application 200 enters a throttling period. Low-water mark 220 and high-water mark 215 may be configured to suit whatever service performed by the client-server architecture.

When counter 210 reaches high-water mark 215, application 210 enters a throttling period. Throttle component 205 generates a throttle identifier for the current throttling period and adds the throttle identifier to acknowledgments sent to clients. The throttle identifier signals to clients that the server is currently throttling requests, as well as distinguishes one throttling period on that server from another. As a result, clients wait for a certain period before sending subsequent requests. A client may receive subsequent acknowledgments from application 200 that include a throttle identifier that is identical to a previously received throttle identifier. In such a case, the client increases the wait period. In one embodiment, the client increases the wait period exponentially. Doing so allows the server to complete outstanding requests while still accepting client requests at a decreased rate. Generally, server application 200 continues throttling requests until the counter returns to a value below the low-water mark.

Table I, below, summarizes the different actions undertaken by the server after comparing the counter (both the current value and the value immediately preceding) with the water mark values.

TABLE I

Actions undertaken by the server after comparing the counter relative to the water mark values

| Previous counter | Current counter | Server action |
|---|---|---|
| Below low-water | Below low-water | Do not enter throttling period |
| Below low-water | Between low-water and high-water | Do not enter throttling period |
| Below low-water | Above high-water | Enter new throttling period |
| Between low-water and high-water | Below low-water | Exit throttling period if active |
| Between low-water and high-water | Between low-water and high-water | Remain in throttling period if active |
| Between low-water and high-water | Above high-water | Enter new throttling period or remain in current throttling period if active |
| Above high-water | Below low-water | Exit throttling period if active |
| Above high-water | Between low-water and high-water | Remain in current throttling period |
| Above high-water | Above high-water | Remain in current throttling period |

Figure 3:
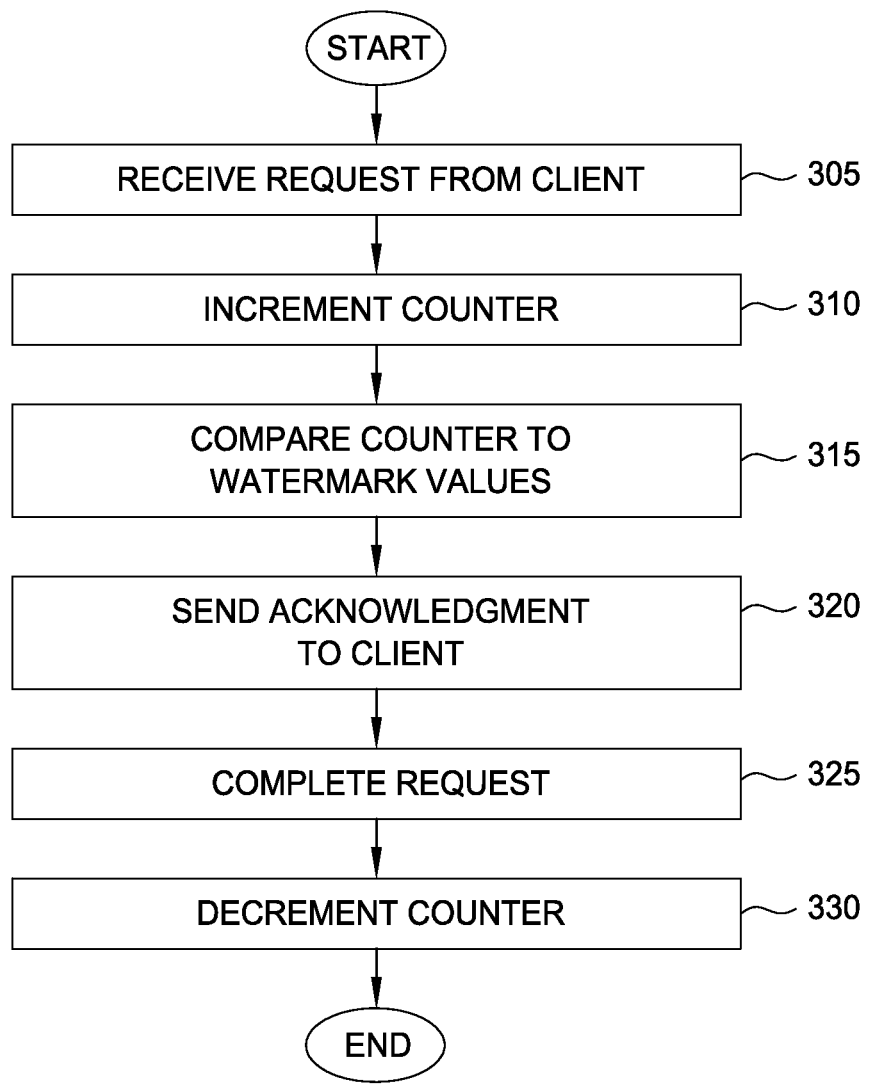
FIG. 3 illustrates a method for throttling multiple client applications sending data to a server application, according to one embodiment.

FIG. 3 illustrates a method 300 for throttling client applications sending data to a server application, according to one embodiment. At step 305, the server receives a request from a client application. For example, a client may be sending a large group of social media posts for processing by the server. At step 310, after receiving such a data package from a client, the server increments a counter. As noted, the counter represents how many outstanding client requests that the server is responsible for at a given moment.

At step 315, the server compares the counter to two threshold values: a low-water mark and a high-water mark. As stated, the low-water mark and high-water mark are two configurable values, where the high-water mark generally represents a point where the server is close to being overwhelmed with client requests and the low-water mark generally represents a volume where the server does not risk running out of work (or where server is capable of processing the requests without dropping requests). Depending on what the counter value is with respect to the water mark values, the server may enter a throttling period and require clients to wait a certain amount of time before sending subsequent requests. More specifically, if the counter is above the high-water mark, the server initiates a throttling period.

At step 320, the server sends an acknowledgment to the client. If the server is currently in a throttling session, the acknowledgment may include a throttle identifier corresponding to the session. At step 325, the server completes the request. At step 330, the server decrements the counter. After decrementing the counter, the server again compares the counter value with the water marks to determine whether to exit the throttling period (if the server is currently throttling requests).

Figure 4:
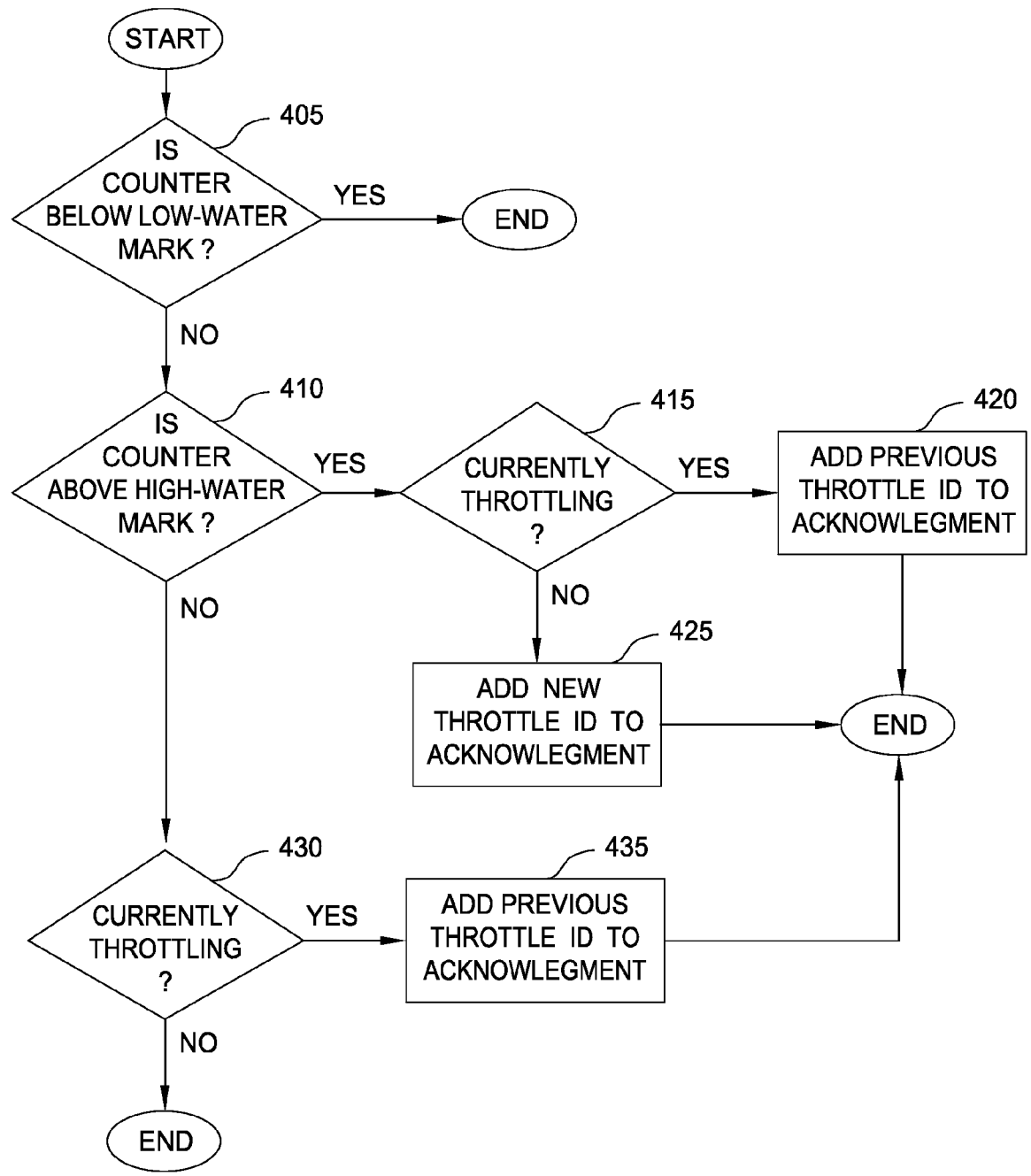
FIG. 4 illustrates a method for determining whether to throttle requests from client applications, according to one embodiment.

FIG. 4 illustrates a method 400 for determining whether to throttle requests from client applications, according to one embodiment. More specifically, method 400 describes whether a server begins (or ends) a throttling period based on the counter value relative to the low-water mark and high-water mark values. As shown, method 400 begins at step 405 where the server determines whether the counter value is below the low-water mark. If so, then the server processes the request normally. That is, if the server is currently in a throttling period, then the server ends the current throttling period because the number of requests being received is no longer at the level which may overwhelm the processing capability of the server. Similarly, if the server is not in currently in a throttling period, then the server does not initiate one.

However, if the counter is above the low-water mark, the server determines whether the counter is also above the high-water mark (step 410). If so, then the server initiates a throttling period to avoid being overwhelmed by incoming requests while processing outstanding ones. To throttle client requests, the server adds a throttle identifier to a request acknowledgment. Clients, upon receiving an acknowledgment with the throttle identifier, delay further requests in response. If a client receives a subsequent acknowledgment that includes a throttle identifier that is identical to a previous identifier, then the client increases the delay period. The delay period set by clients may be a configurable value. Further, such increase may be exponential with the receipt of each identical throttle identifier.

As stated, the throttle identifier is specific to each distinct throttling period initiated by a server. Therefore, it is possible that clients may receive different throttling identifiers from the server (e.g., if the server enters a throttling period, exits a throttling period, and subsequently enters another throttling period thereafter). In any case, at step 415, the server determines whether it is already in a throttling period (e.g., due to the immediately preceding counter value being above the high-water mark). At step 420, if so, the server adds the throttle identifier already being used for the throttling period to the acknowledgment. However, if the server is not currently throttling, then the server has just entered a new throttling period. Thus, the server adds a new throttle identifier to the acknowledgment.

On the other hand, if the counter value is below the high-water mark (i.e., the counter value is between the low-water mark and the high-water mark), then the server determines whether it is already in a throttling period (step 430). If so, then the server continues to throttle incoming requests from clients until other outstanding requests are completed (i.e., the counter falls below the low-water mark). At step 435, the server adds the throttle identifier already being used for the throttling period to the acknowledgment. If the server is not currently throttling, then the server continues to process requests normally.

Figure 5:
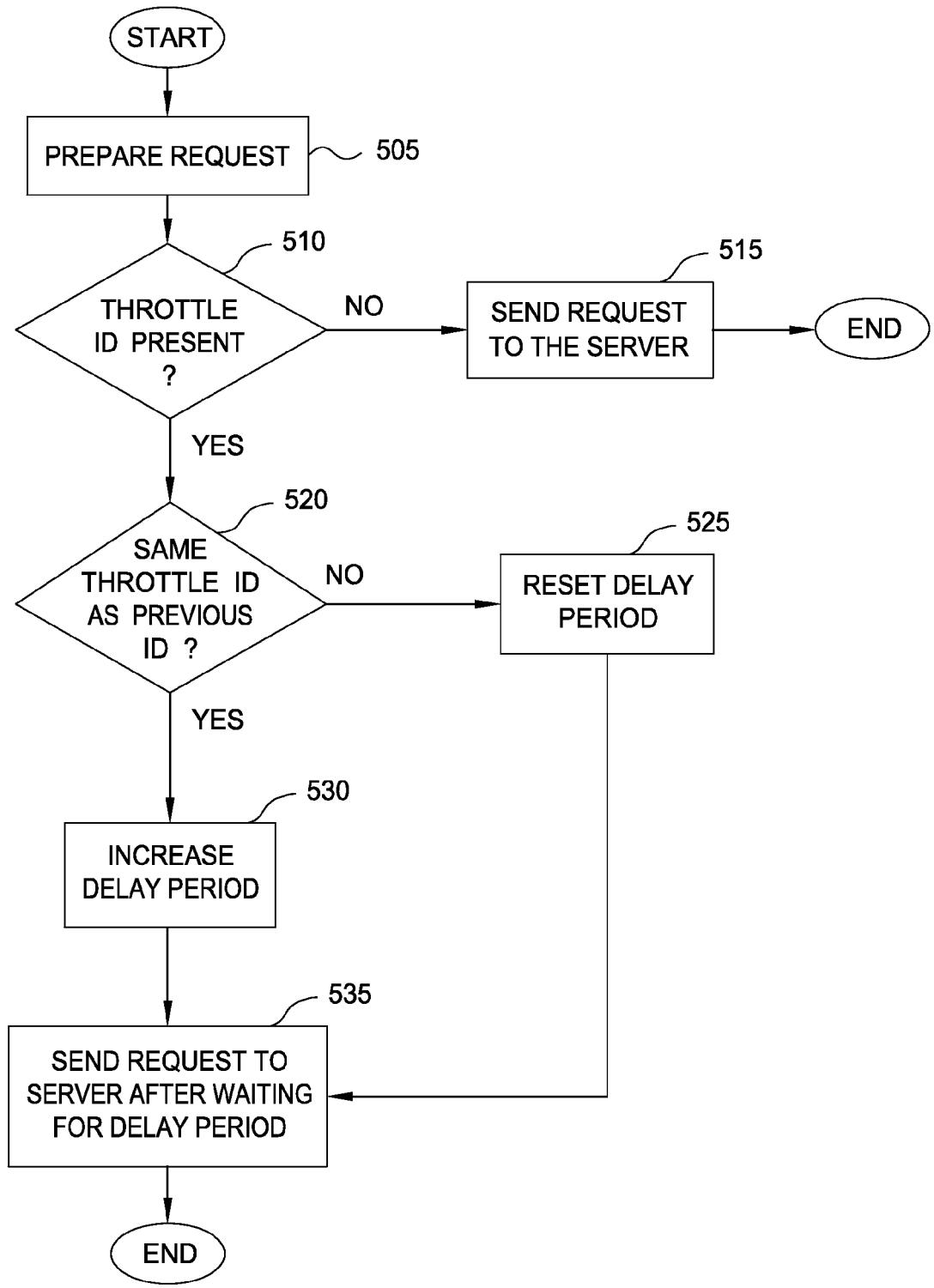
FIG. 5 illustrates a method for sending requests to a server application, according to one embodiment.

FIG. 5 illustrates a method 500 for sending requests to a server application, according to one embodiment. More specifically, method 500 describes the throttling protocol from the perspective of the client application sending requests to a server application. As shown, method 500 begins at step 505, where the client application prepares a request. For example, in a social media setting, the request may correspond to a client application sending a data package of messages posted to a social media service, such as a stream of status updates, to the server for indexing. Before sending the request, the client determines whether the server issued a throttle identifier in acknowledgment in response to a previous request by the client (step 510). If so, the client begins throttling the request sent to that server. That is, the client delays sending additional work to that server. The initial delay period is a configurable value, but may be set to a number of seconds. However, if the client continues to receive acknowledgments indicating that the server is still in the same throttling session (i.e., based on the throttle identifier), then the client may increase the delay period (e.g., by doubling the number of second a client delays sending a workload unit to the server). Of course, other back-off or delay algorithms could be used. Increasing the delay rate at which requests are sent to a client allows the server to continue to process requests while reaching a stable rate of requests being sent from a group of clients. Further, because each client receiving the throttling identifier from the server delays subsequent requests, the back-off is fair among all the clients that send requests to a given server. At step 515, if a throttle identifier is not present, then the client sends the request to the server without waiting for a delay period.

On the other hand, if present, the client application determines if the current throttle identifier matches previous throttle identifier (if any) in an acknowledgment. If the two do not match, then the server has entered a new throttling session. In such a case, the client resets the delay period (step 525). At step 535, after waiting for the delay period, the client sends the request to the server.

However, if the two throttle identifiers are identical, then the server is continuing a previous throttling session. As a result, the client increases the current delay period. In one embodiment, the client application increases the delay period exponentially. For example, assume that an initial delay period is one second. Thus, if the client application receives, from the server, a fourth consecutive acknowledgment with the same throttle identifier, the client application increases the delay period to sixteen seconds. Of course, one having skill in the art will recognize that other methods of increasing the delay period and other units of time in delaying requests may be applied.

Figure 6:
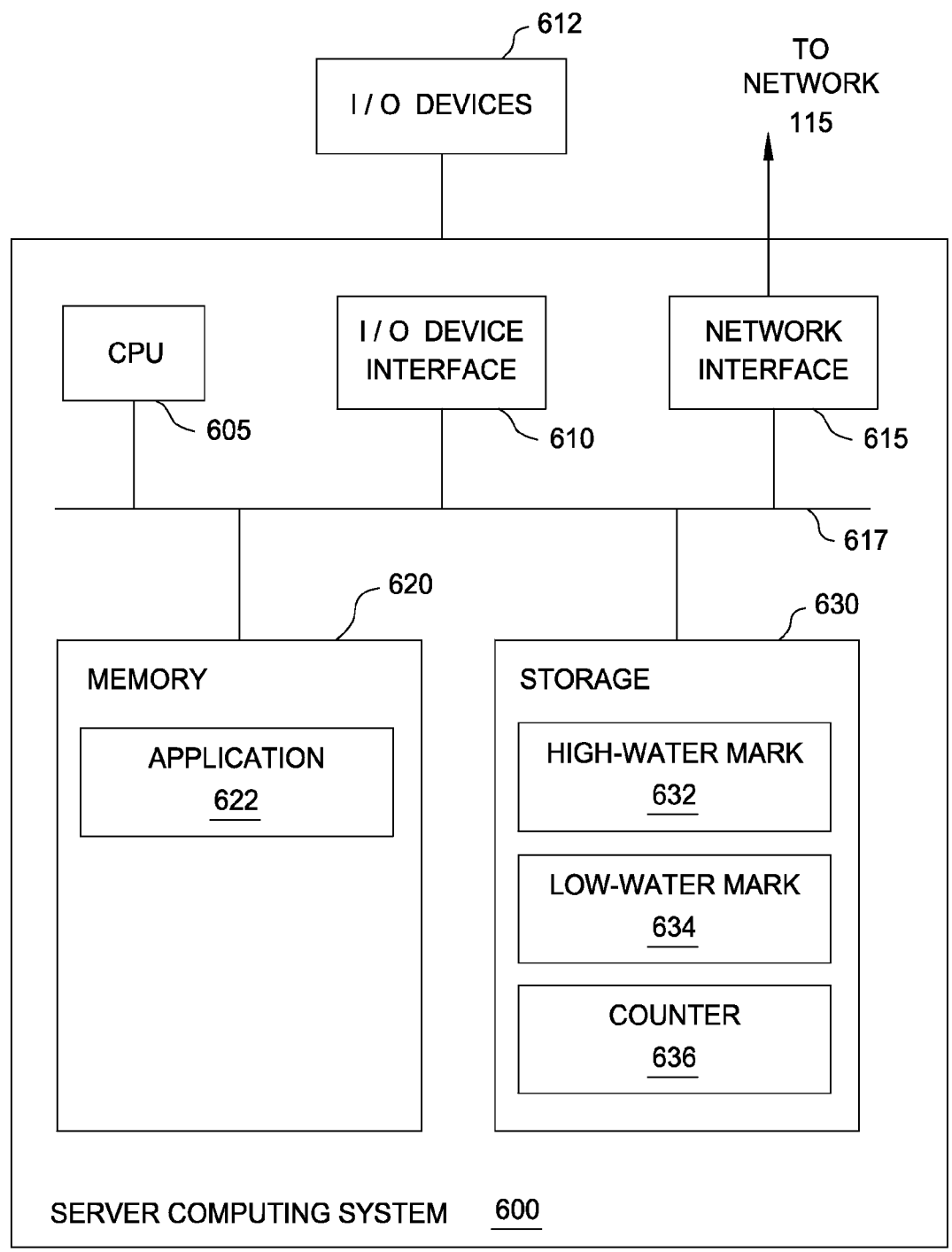
FIG. 6 illustrates an example server computing system configured to throttle multiple client applications sending data, according to one embodiment of the invention.

FIG. 6 illustrates an example server computing system 600 configured to throttle multiple client applications sending data, according to one embodiment. As shown, computing system 600 includes, without limitation, a central processing unit (CPU) 605, a network interface 615, a network interface 615, a memory 620, and storage 630, each connected to a bus 617. Computing system 600 may also include an I/O device interface 610 connecting I/O devices 612 (e.g., keyboard, display and mouse devices) to the computing system 600. Further, in context of this disclosure, the computing elements shown in computing system 600 may correspond to a physical computing system (e.g., a system in a data center) or may be a virtual computing instance executing within a computing cloud.

CPU 605 retrieves and executes programming instructions stored in memory 620 as well as stores and retrieves application data residing in the storage 630. The interconnect 617 is used to transmit programming instructions and application data between CPU 605, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes an application 622. Storage 630 includes a high-water mark 532, a low-water 534, and a counter 536. Application 622 provides a service that is accessible by multiple client computer systems. Further, application 622 includes uses high-water mark 532 and low-water mark 534 to determine whether to throttle requests. High-water mark 532 and low-water mark 534 serve as threshold measures for the amount of requests that application 622 currently has outstanding. For example, if counter 536 exceeds high-water mark 532, application 622 begins throttling client requests.

After entering a throttling period, application 622 generates (e.g., through a throttle component) a throttle identifier corresponding to the throttling period to include in acknowledgments sent in response to client requests. The throttle identifier signals client systems to wait a period before sending an additional request. With each successive acknowledgment including the same identifier sent to a certain client, the client increases the delay period.

Figure 7:
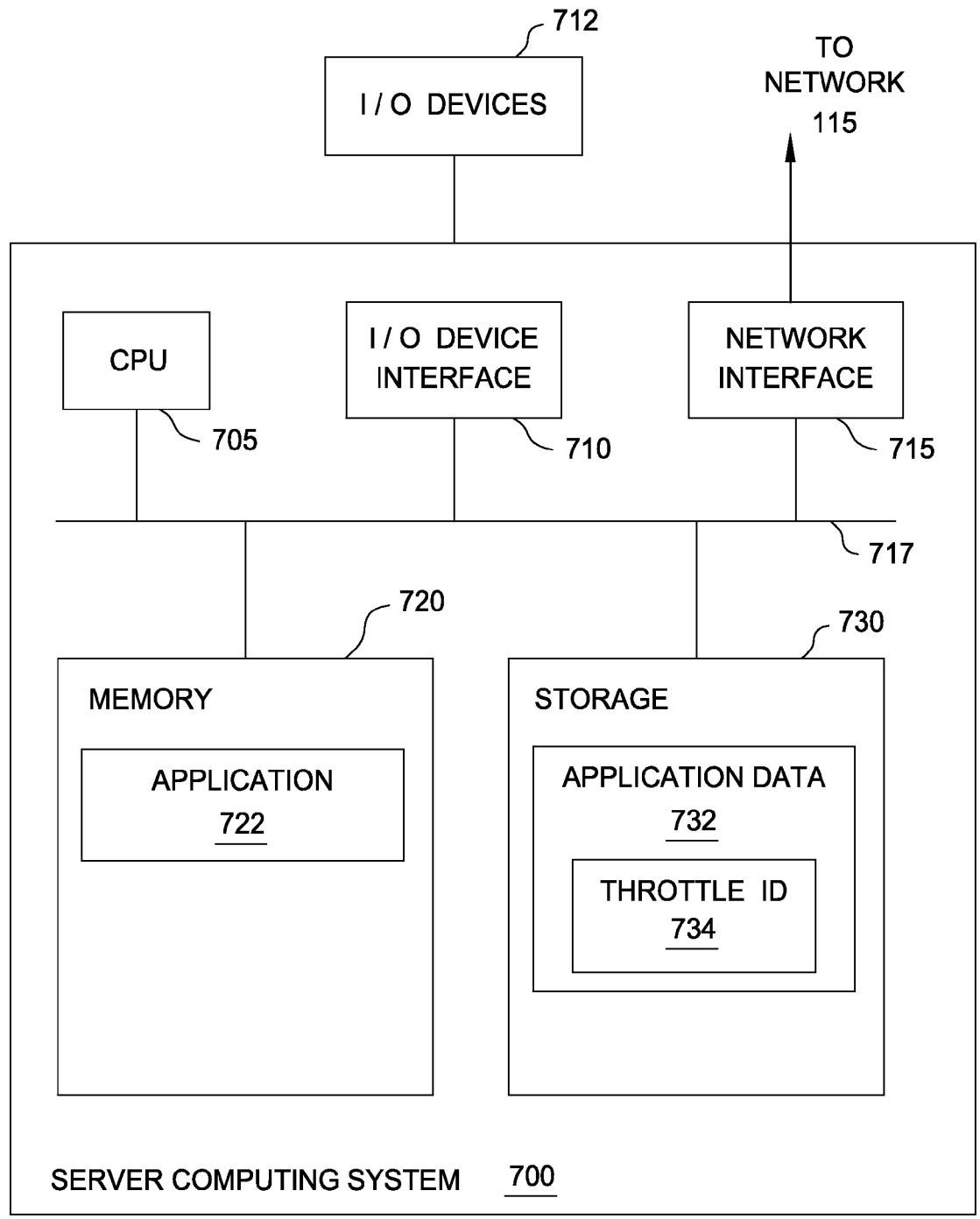
FIG. 7 illustrates an example client computing system, according to one embodiment of the invention.

FIG. 7 illustrates an example client computing system 700, according to one embodiment. As shown, computing system 700 includes, without limitation, a central processing unit (CPU) 705, a network interface 715, a network interface 715, a memory 720, and storage 730, each connected to a bus 717. Computing system 700 may also include an I/O device interface 710 connecting I/O devices 712 (e.g., keyboard, display and mouse devices) to the computing system 700. Further, in context of this disclosure, the computing elements shown in computing system 700 may correspond to a physical computing system (e.g., a system in a data center) or may be a virtual computing instance executing within a computing cloud.

CPU 705 retrieves and executes programming instructions stored in memory 720 as well as stores and retrieves application data residing in the storage 730. The interconnect 717 is used to transmit programming instructions and application data between CPU 705, I/O devices interface 710, storage 730, network interface 715, and memory 720. Note, CPU 705 is included to be representative of a single CPU, multiple CPUs, a single CPU having multiple processing cores, and the like. Memory 720 is generally included to be representative of a random access memory. Storage 730 may be a disk drive storage device. Although shown as a single unit, storage 730 may be a combination of fixed and/or removable storage devices, such as fixed disc drives, removable memory cards, or optical storage, network attached storage (NAS), or a storage area-network (SAN).

Illustratively, memory 720 includes an application 722. Storage 730 includes application data 732. Application 722 is program that accesses services provided by a server application in a client-server infrastructure. Application 722 sends application data 732 to the server application in the form of a request. In response, the server performs the requested work and sends a response in the form of an acknowledgment to application 722.

In one embodiment, if the server is currently in a throttling period, the server includes a throttle identifier 734 with each acknowledgment. When application 722 receives a throttle identifier 734, application 722 waits for a certain delay period before sending a next request. If subsequent acknowledgments include the same throttle identifier 734, application 722 increases the delay period. With each successive acknowledgment, the amount by which the client increases the delay period rises exponentially.

In the preceding, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

As described, embodiments presented herein provide techniques for throttling client requests in a client-server infrastructure. While a server is in a throttling period, the server includes a throttle identifier with each acknowledgment that signals to a client to delay subsequent requests. Advantageously, this approach does not require clients to be aware of other clients communicating with the server. Further, the approach ensures fairness across clients without any one client facing a starvation problem. Additionally, while the server is in a throttling period, the server does expend as many resources in handling incoming requests as it would under conventional throttling protocols.

While the foregoing is directed to embodiments of the present invention, other and further embodiments of the invention may be devised without departing from the basic scope thereof, and the scope thereof is determined by the claims that follow.

What is claimed is:

1. A computer-implemented method for managing a rate of receiving data packages by a server, comprising:
   receiving, from a first one of a plurality of clients, a data package to be processed by the server;
   in response to determining that a total number of pending data packages waiting to be processed by the server exceeds a first threshold, initiating a throttling session on the server, wherein the clients delay sending additional data packages to the server during the throttling session;
   generating an identifier specific to the throttling session to insert in an acknowledgement of the received data package, wherein the identifier is inserted in acknowledgements sent in response to each data package sent by clients during the throttling session; and
   sending the acknowledgment of the received data package to the client, wherein the acknowledgement includes the identifier specific to the throttling session.

2. The method of claim 1, wherein the client is configured to delay sending a subsequent data package for a delay period upon receiving the acknowledgment with the identifier.

3. The method of claim 1, wherein an acknowledgment is sent to the client for each data package received from the client, and wherein the client is configured to increase the delay period for each successive acknowledgment that includes the identifier specific to the throttling session.

4. The method of claim 3, wherein the delay period is increased exponentially with each successive acknowledgment.

5. The method of claim 1, further comprising, upon determining that the number of pending data packages falls below a second threshold, ending the throttling session.

6. The method of claim 5, wherein the first threshold is a greater value than the second threshold.

7. The method of claim 1, wherein the client is configured to:
   (i) prepare a data package to send to the server for processing, and, upon determining that an acknowledgment sent by the server relative to a previous data package sent to the server includes an identifier specific to the throttling session; and (ii) send the data package to the server after waiting for a delay period.

8. A non-transitory computer-readable storage medium storing an application, which, when executed on a processor, performs an operation for managing a rate of receiving data packages by a server, the operation comprising:

receiving, from a first one of a plurality of clients, a data package to be processed by the server;

in response to determining that a total number of pending data packages waiting to be processed by the server exceeds a first threshold, initiating a throttling session on the server, wherein the clients delay sending additional data packages to the server during the throttling session;

generating an identifier specific to the throttling session to insert in an acknowledgement of the received data package, wherein the identifier is inserted in acknowledgements sent in response to each data package sent by clients during the throttling session; and sending the acknowledgment of the received data package to the client, wherein the acknowledgement includes the identifier specific to the throttling session.

9. The computer-readable storage medium of claim 8, wherein the client is configured to delay sending a subsequent data package for a delay period upon receiving the acknowledgment with the identifier.

10. The computer-readable storage medium of claim 8, wherein an acknowledgment is sent to the client for each data package received from the client, and wherein the client is configured to increase the delay period for each successive acknowledgment that includes the identifier specific to the throttling session.

11. The computer-readable storage medium of claim 10, wherein the delay period is increased exponentially with each successive acknowledgment.

12. The computer-readable storage medium of claim 8, wherein the operation further comprises, upon determining that the number of pending data packages falls below a second threshold, ending the throttling session.

13. The computer-readable storage medium of claim 12, wherein the first threshold is a greater value than the second threshold.

14. The computer-readable storage medium of claim 8, wherein the client is configured to:

(i) prepare a data package to send to the server for processing, and, upon determining that an acknowledgment sent by the server relative to a previous data package sent to the server includes an identifier specific to the throttling session; and (ii) send the data package to the server after waiting for a delay period.

15. A system, comprising:

a processor, and;

a memory storing a program, which, when executed on the processor, performs an operation for managing a rate of receiving data packages by a server, the operation comprising:

receiving, from a first one of a plurality of clients, a data package to be processed by the server;

in response to determining that a total number of pending data packages waiting to be processed by the server exceeds a first threshold, initiating a throttling session on the server, wherein the clients delay sending additional data packages to the server during the throttling session;

generating an identifier specific to the throttling session to insert in an acknowledgement of the received data package, wherein the identifier is inserted in acknowledgements sent in response to each data package sent by clients during the throttling session; and sending the acknowledgment of the received data package to the client, wherein the acknowledgement includes the identifier specific to the throttling session.

16. The system of claim 15, wherein the client is configured to delay sending a subsequent data package for a delay period upon receiving the acknowledgment with the identifier.

17. The system of claim 15, wherein an acknowledgment is sent to the client for each data package received from the client, and wherein the client is configured to increase the delay period for each successive acknowledgment that includes the identifier specific to the throttling session.

18. The system of claim 17, wherein the delay period is increased exponentially with each successive acknowledgment.

19. The system of claim 15, wherein the operation further comprises, upon determining that the number of pending data packages falls below a second threshold, ending the throttling session.

20. The system of claim 19, wherein the first threshold is a greater value than the second threshold.

* * * * *